United States Patent
Cho (10) Patent No.: US 9,871,668 B2
(45) Date of Patent: Jan. 16, 2018

(54) METHOD AND APPARATUS FOR PERFORMING HARQ OPERATION IN WIRELESS COMMUNICATION SYSTEM

(71) Applicant: LG ELECTRONICS INC., Seoul (KR)

(72) Inventor: Heejeong Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 218 days.

(21) Appl. No.: 14/427,563

(22) PCT Filed: Jul. 10, 2013

(86) PCT No.: PCT/KR2013/006158
§ 371 (c)(1),
(2) Date: Mar. 11, 2015

(87) PCT Pub. No.: WO2014/042345
PCT Pub. Date: Mar. 20, 2014

(65) Prior Publication Data
US 2015/0249544 A1    Sep. 3, 2015

Related U.S. Application Data

(60) Provisional application No. 61/702,213, filed on Sep. 17, 2012.

(51) Int. Cl.
*H04L 12/18* (2006.01)
*H04L 1/18* (2006.01)
(Continued)

(52) U.S. Cl.
CPC ........ *H04L 12/1886* (2013.01); *H04L 1/1829* (2013.01); *H04L 1/1861* (2013.01); *H04L 5/0055* (2013.01); *H04W 76/043* (2013.01)

(58) Field of Classification Search
CPC . H04L 12/1886; H04L 1/1861; H04L 5/0055; H04L 1/1829; H04W 76/043
See application file for complete search history.

(56) References Cited

U.S. PATENT DOCUMENTS

| | | | |
|---|---|---|---|
| 6,505,253 B1* | 1/2003 | Chiu | H04L 12/1868 370/229 |
| 8,520,575 B2* | 8/2013 | Doppler | H04W 72/02 370/310 |

(Continued)

FOREIGN PATENT DOCUMENTS

| | | |
|---|---|---|
| WO | 2012/011786 | 1/2012 |
| WO | 2012/091420 | 7/2012 |

OTHER PUBLICATIONS

PCT International Application No. PCT/KR2013/006158, Written Opinion of the International Searching Authority dated Oct. 17, 2013, 1 page.

*Primary Examiner* — Mounir Moutaouakil
(74) *Attorney, Agent, or Firm* — Lee Hong Degerman Kang & Waimey (57) ABSTRACT

A method and apparatus for transmitting feedback information in a device-to-device (D2D) communication system is provided. A cluster head is determined among a plurality of user equipment (UE) belong to a cluster, the cluster head transmits a notification to other UEs belong to the cluster, determines whether or not multicast data is successfully received by the other UEs, and transmits feedback information to the network.

12 Claims, 4 Drawing Sheets

(51) Int. Cl.
*H04L 5/00* (2006.01)
*H04W 76/04* (2009.01)

(56) References Cited

U.S. PATENT DOCUMENTS

| | | | | |
|---|---|---|---|---|
| 8,724,533 | B2* | 5/2014 | Thubert | H04L 45/16 370/312 |
| 8,886,744 | B1* | 11/2014 | Pabla | G06F 9/5072 709/217 |
| 9,232,550 | B2* | 1/2016 | Gao | H04W 72/085 |
| 2005/0174972 | A1* | 8/2005 | Boynton | H04L 47/10 370/337 |
| 2007/0091838 | A1* | 4/2007 | Kobayashi | H04L 45/42 370/328 |
| 2012/0066396 | A1 | 3/2012 | Kang et al. | |
| 2012/0120927 | A1 | 5/2012 | Bucknell | |
| 2012/0163252 | A1 | 6/2012 | Ahn et al. | |
| 2012/0294223 | A1* | 11/2012 | Li | H04L 12/1868 370/312 |
| 2013/0201954 | A1* | 8/2013 | Gao | H04W 72/0413 370/329 |
| 2013/0223398 | A1* | 8/2013 | Li | H04W 72/085 370/329 |
| 2013/0250771 | A1* | 9/2013 | Yu | H04W 76/023 370/241 |
| 2014/0094183 | A1* | 4/2014 | Gao | H04W 72/048 455/450 |
| 2014/0105096 | A1* | 4/2014 | Wang | H04L 12/189 370/312 |
| 2014/0314057 | A1* | 10/2014 | Van Phan | H04W 56/0045 370/336 |
| 2015/0131475 | A1* | 5/2015 | Van Phan | H04W 84/18 370/254 |
| 2015/0173115 | A1* | 6/2015 | Van Phan | H04W 76/023 455/404.2 |
| 2015/0296558 | A1* | 10/2015 | Seo | H04W 76/04 370/338 |

\* cited by examiner

METHOD AND APPARATUS FOR PERFORMING HARQ OPERATION IN WIRELESS COMMUNICATION SYSTEM

CROSS-REFERENCE TO RELATED APPLICATIONS

This application is the National Stage filing under 35 U.S.C. 371 of International Application No. PCT/KR2013/006158, filed on Jul. 10, 2013, which claims the benefit of U.S. Provisional Application Ser. No. 61/702,213, filed on Sep. 17, 2012, the contents of which are hereby incorporated by reference herein in their entirety.

TECHNICAL FIELD

The present invention relates to wireless communications, and more particularly, to a method and apparatus for performing a Hybrid Automatic Retransmit reQuest (HARQ) operation in a device-to-device (D2D) communication system.

BACKGROUND ART

There is ongoing development for direct communication between devices in communication system. In recent years, a device-to-device (D2D) communication underlying a cellular network has been studied. The D2D communication allows a direct communication between UEs or devices without passing through a base station. In order to achieve the direct communication between the devices or UEs, a device-to-device (D2D) link is required. By utilizing the D2D link, the UEs or devices belong to the same cell or different cells may directly exchange data each other without passing through a base station or a network.

In order to enable such direct communication between UEs or devices in a current cellular communication system, it is a need to be solved for problems relating to a HARQ processing method between UEs or devices performing transmission and reception through the D2D link. In particular, it is necessary to minimize a HARQ signaling overhead causing by a plurality of UEs or devices in the D2D communication system. Further, in order to control the efficiency of control signaling and to minimize an impact on D2D communication system efficiency, it is necessary to provide an optimized HARQ feedback signaling for a cluster within the D2D communication system

BEST MODE FOR CARRYING OUT THE INVENTION

The present invention provides a method and apparatus for transmitting feedback information in a device-to-device (D2D) communication system. The present invention provides a method for transmitting feedback information in the device-to-device (D2D) communication system by utilizing a cluster head among a plurality of user equipment.

In an aspect, a method for transmitting feedback information in a device-to-device (D2D) communication system is provided. The method includes determining a cluster head among a plurality of user equipment (UE) belong to a cluster, receiving, by the cluster head, multicast data from a network; transmitting a notification to other UEs belong to the cluster whether or not the multicast data is successfully received by the cluster head, determining whether or not the multicast data is successfully received by the other UEs belong to the cluster, and transmitting the feedback information to the network.

In another aspect, an apparatus for transmitting feedback information in a device-to-device (D2D) communication system is provided. The apparatus includes a radio frequency (RF) unit for transmitting or receiving data, a processor, operatively coupled to the RF unit, and configured for: determining a cluster head among a plurality of user equipment (UE) belong to a cluster, receiving multicast data from a network, transmitting a notification to other UEs belong to the cluster whether or not the multicast data is successfully received by the cluster head, determining whether or not the multicast data is successfully received by the other UEs belong to the cluster, and transmitting the feedback information to the network.

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or evolved UTRA (E-UTRA). IEEE 802.16m is the evolution of IEEE 802.16e, and it provides a backward compatibility with an IEEE 802.16e-based system. IEEE 802.16p is optimized for machine-to-machine (M2M) communication based on IEEE 802.16e and IEEE 802.16m. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

For clarity, some parts of the following description mainly concern specific communication technologies, by which the technical idea of the present invention may be non-limited. Moreover, in the following description, specific terminologies are provided to help the understanding of the present invention. And, the use of the specific terminology can be modified into another form within the scope of the technical idea of the present invention.

Hereinafter, a device-to-device (D2D) communication system will be described.

Figure 1:
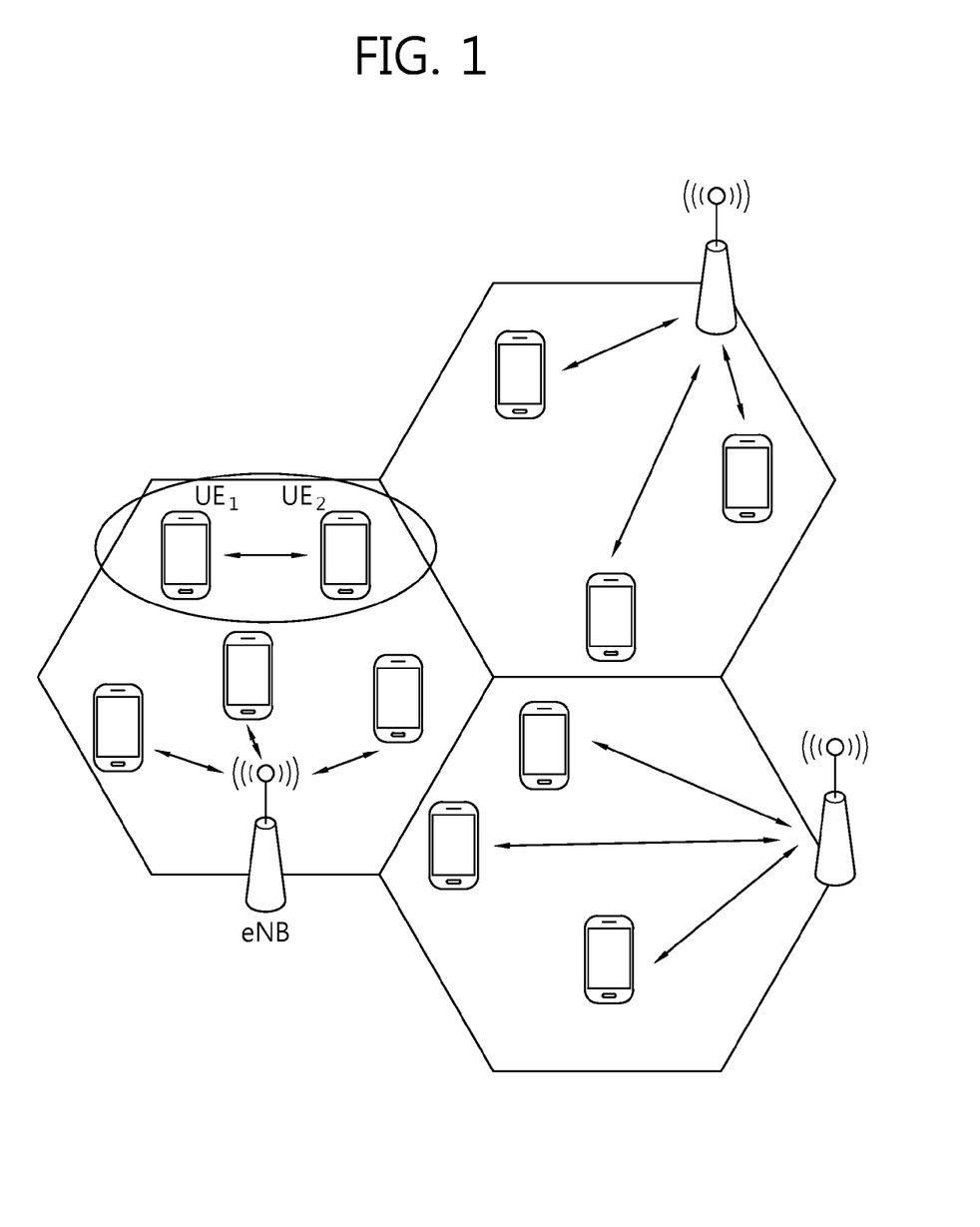
FIG. 1 shows a device-to-device (D2D) communication system.

As illustrated in FIG. 1, the cellular (i.e., 3GPP, LTE, LTE-A) and D2D communications may share the same resources with potential interference between them. That is, the D2D communications may operate as an undelay of the cellular network and enable the cellular network operator to offer fast access to its spectrum. As aforementioned, the D2D communications is beginning to be broadly integrated into the cellular communication systems such as the LTE/LTE-A cellular communication system as specified in the 3GPP. The integration of direct D2D communications allows the end devices (e.g., user equipment (UE), mobile station (MS), terminal, mobile device, etc.) to communicate over a direct wireless communication link that uses radio resources of the cellular communication system or network. Here, the cellular communication resources may be shared by the devices communicating directly with each other with devices having a normal communication link to a base station. Here, the devices or UEs may communicate directly within each other over the D2D links, and the UE in D2D connection may be remained to be controlled by the eNBs. The eNBs may control the resources used for cellular communications and by the D2D link. Also, the eNBs may set constraints on the transmit power of D2D transmitter to limit the interference experienced at the cellular receivers.

The D2D communication enables new service opportunities and reduces a base station (e.g. eNB) load for short range data intensive peer-to-peer communication. The cellular network may establish a new type of radio bearer dedicated for D2D communications. Further, by adding the D2D communications into the cellular communication system, this allows to reduce transmitter power consumption in both user equipment and base stations. Also, a capacity of the cellular communication system can be achieved such that more service for the user equipment can be established. Further, the D2D communications may support quality of service (QoS), enhance frequency use efficiency through frequency reuse, and increase a communication distance. Further, the D2D communications may improve the transmission capacity of user equipment at a cell boundary, and also enhance the frequency use efficiency of a whole cell through frequency reuse.

In recent years, a technology related to proximity based applications and services has been mainly studied and researched. Here, the proximity based applications and services are based on a plurality of devices or a plurality of users that are close to each other. The proximity based applications may maximize a device battery life while reducing the signaling overload to the network. Many different types of proximity based application and services are existed in recent technology, such as a device-to-device (D2D) and/or a machine-to-machine (M2M).

In recent years, it has been studied and researched a need and an opportunity for 3GPP to evolve the LTE platform in order to intercept a demand of proximity based application. The objectives of the study have been evaluated in many different aspects. One of many different aspects may be a security aspect that provides a security architecture for device-to-device, as part of the overall 3GPP security architecture. Another aspect of the study may be a system architecture for device-to-device communications, which includes a service authorization architecture and procedures, over the air device discovery architecture, an IP link model and addressing architecture and procedures, an architecture and procedures for over the air session establishment between devices, an architecture and procedures for session continuity aspects between over the air device-to-device communication and cellular network, and an interworking with 3GPP and non-3GPP accesses, etc. Further, another aspect of the study may be service requirements for device-to-device communications, which includes service requirements for over the air device discovery, service requirements for over the air device-to-device user plane communications, and service requirements for interworking between over the air device-to-device communications and traditional cellular communications. Further, another aspect of the study may be LTE enhancements to enable device-to-device over the air discovery, which concern for identifying assumptions and performance metrics for proximity based application evaluation, for identifying physical layer options and solutions to incorporate in LTE the ability for device to discover each other directly over the air, and for identifying protocol options and solutions to allow applications running in proximal devices to discover each other over the air. Further, another aspect of the study may be LTE enhancements to enable device over the air paging and communication, which concern for evaluating assumptions and performance metrics in line with the proximity based applications, for identifying physical layer options and solutions to incorporated in the LTE the ability for device to communicate directly between them, for identifying protocol options and solutions to allow basic procedures over the air between devices for paging, connection establishment, and for LTE enhancements to enable distributed interference management in the context of device to device communications. Finally, the study should cover both LTE FDD and LTE TDD operations, options for dedicated spectrum operations, and inter-operator operation options.

Hereinafter, a hybrid automatic repeat request (HARM) scheme will be described.

An error compensation scheme is used to secure communication reliability. Examples of the error compensation scheme include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

If the error is not detected from the received data, a receiver transmits a positive-acknowledgement (ACK) signal as a reception confirmation to report to a transmitter that reception is successful. If the error is detected from the received data, the receiver transmits a negative-acknowledgement (NACK) signal as the reception confirmation to report to the transmitter that the error is detected. The transmitter can retransmit the data upon receiving the NACK signal.

Hereinafter, a machine to machine (M2M) communication system will be described.

First of all, the M2M means a communication between one electronic device and another electronic device as represented. In particular, the M2M means a communication between objects. Although the M2M generally means a wire/wireless communication between electronic devices or a communication between a user controllable device and a machine, it may especially mean a communication between electronic devices. That is, in the M2m communication system, the devices may be wirelessly communicated each other.

The M2M communication system may have following technical characteristics: 1. Numerous mobile stations in a cell 2. Small data size 3. Small transmission frequency number 4. Limited number of data characteristics 5. Insensitive to time delay. Further, the M2M mobile stations may have following technical characteristics: 1. Transmit data intermittently 2. Have low mobility or fixed 3. Insensitive to latency in signal transmission.

The numerous M2M mobile stations with the above-described characteristics are able to transceive signals in-between or with a base station using multi-hop configuration in-between or a hierarchical structure thereof. In particular, one M2M mobile station may receive a signal from a base station and then may transmit data to another M2M mobile station existing in another layer or a lower layer. Alternatively, one M2M mobile station may receive signals from other M2M mobile stations and then may transmit the received signals to a specific M2M mobile station or the base station. Alternatively, communications may be directly performed between M2M mobile stations by excluding a relay.

There is ongoing development on the institute of electrical and electronics engineers (IEEE) 802.16p standard optimized for machine-to-machine (M2M) communication based on the IEEE 802.16e standard and the IEEE 802.16m standard. The M2M communication can be defined as an information exchange performed between a subscriber station and a server or between subscriber stations in a core network without any human interaction. In the IEEE 802.16p standard, there is an ongoing discussion on enhancement of medium access control (MAC) of the IEEE 802.16 standard and a minimum change of an orthogonal frequency division multiple access (OFDMA) physical layer (PHY) in licensed bands. Due to the discussion on the IEEE 802.16p standard, a wide area wireless coverage is required in the licensed band, and a scope of applying automated M2M communication can be increased for an observation and control purpose.

When accessing a network, requirements demanded by many M2M applications are significantly different from requirements for human-initiated or human-controlled network access. The M2M application can include vehicular telematics, healthcare monitoring of bio-sensors, remote maintenance and control, smart metering, an automated service of a consumer device, etc. The requirements of the M2M application can include very lower power consumption, larger numbers of devices, short burst transmission, device tampering detection and reporting, improved device authentication, etc.

Hereinafter, a structure of cluster will be described.

In general, a plurality of user equipment (UE) is belong to a single cluster. In the processing of a cluster registration, each UE may obtain its own ranking number according to the predefined manner. For example, a UE having a largest processor capacity or a UE located nearest to an eNB may be assigned as a first ranked UE among the plurality of UEs belong to the cluster. In the cluster, there is a specific UE that communicates with a network. That is, this specific UE is only communicated with the network on behalf of other UEs belong to the cluster. In general, this specific UE is called as a cluster head, and a ranking number for the cluster head may be assigned as zero.

Hereinafter, a multicast data transmission will be described.

Figure 2:
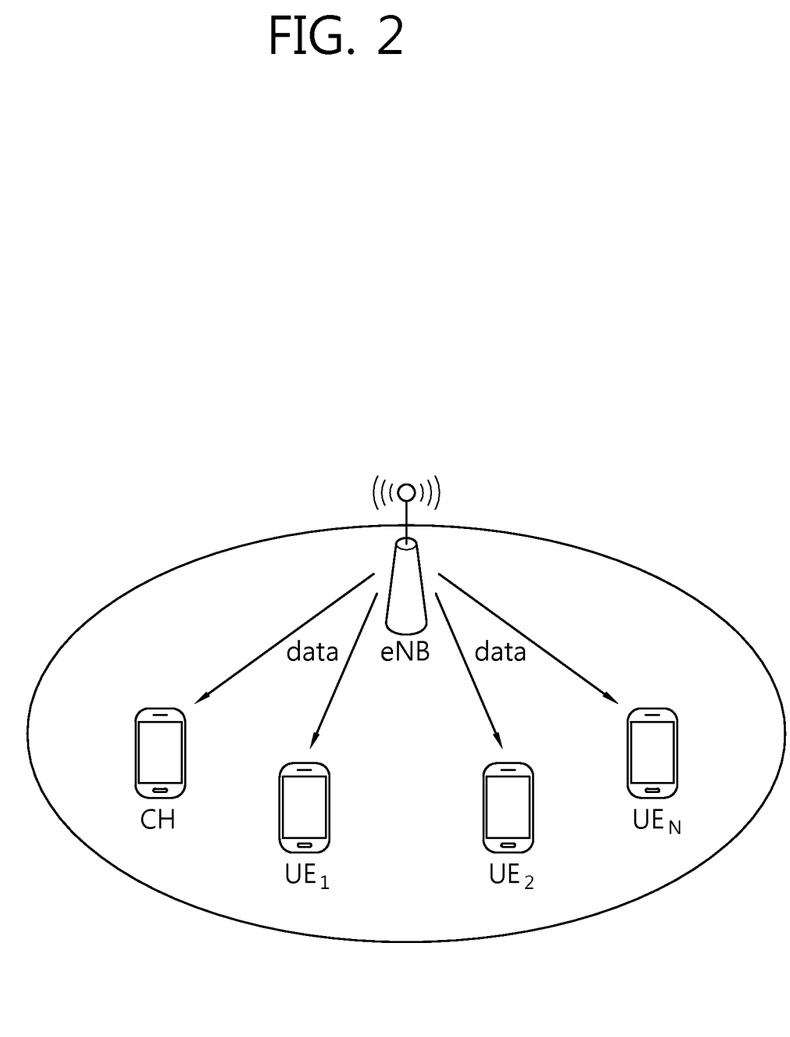
FIG. 2 shows a multicast data transmission in a wireless communication system.

As illustrated in FIG. 2, a network (e.g., eNB) may transmit data to a plurality of UE in a multicast manner. During the multicast data transmission, a Hybrid Automatic Retransmit reQuest (HARQ) feedback operation and/or a data retransmission procedure may be performed by each UE with respect to a corresponding data transmission. As many UE performs the HARQ feedback operation and/or the data retransmission, a signaling overhead may cause. As such, it is necessary to provide an optimized method to minimize the signaling overhead for the performance of the HARQ feedback operation and/or the data retransmission. Specifically, an optimized method for performing HARQ operation in a device-to-device (D2D) communication system must be provided.

The multicast services are becoming more and more popular with the development of cellular wireless networks. That is, in recent technology, data is transmitted to multiple recipients by a base station (e.g., eNodeB). In order to support reliable data delivery in the multicast service, hybrid automatic repeat request (HARQ) scheme may be introduced. That is, each device in the recipient cluster will transmit feedback information such as an acknowledgement and negative acknowledgement (ACK/NACK) message for each of the multicast data. In case that the NACK message is reported by the recipient, the data will be retransmitted by the transmitting end.

Hereinafter, a method for performing HARQ operation and data transmission in a device-to-device (D2D) communication system according to an embodiment of the present invention will be described.

Figure 3:
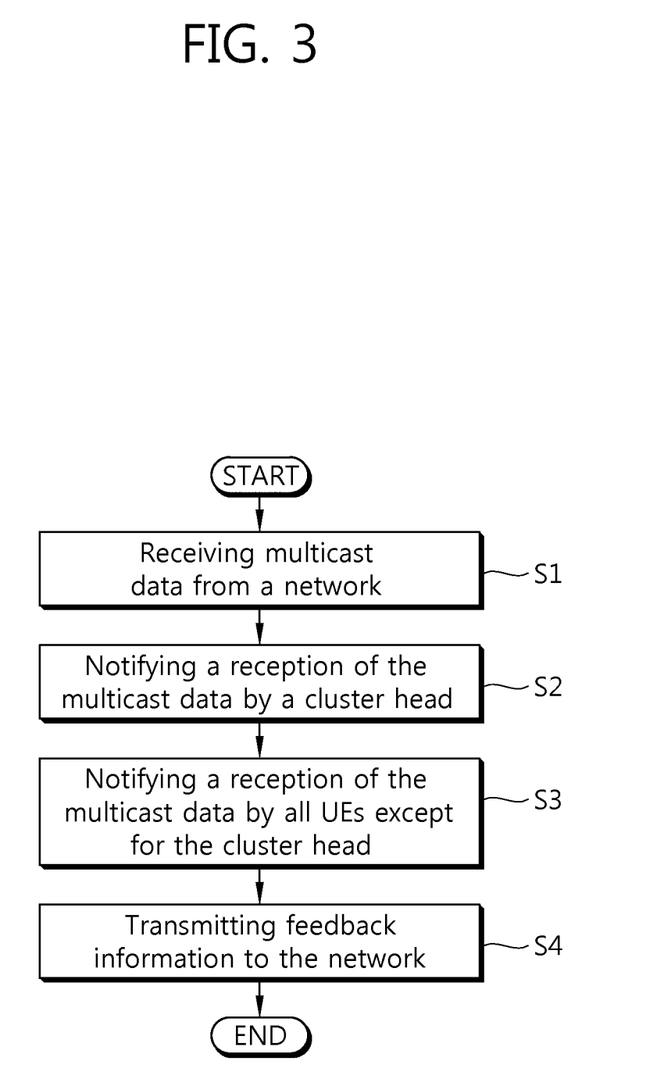
FIG. 3 shows a block diagram illustrating a method of transmitting feedback information according to the present invention.

As illustrated in FIG. 3, a network may transmit multicast data to a plurality of UEs belong to a cluster (S1). Thereafter, a cluster head may notify to other UEs whether or not the multicast data transmitted from the network is successfully received (S2). This notification may be transmitted to other UEs through a D2D link established in the cluster. Here, the reception of the multicast data may be notified by the cluster head as following three different options: 1) always notify, 2) ACK based feedback, and 3) NACK based feedback. According to the first option, the cluster head may send a positive acknowledgment (ACK) feedback to all other UEs belong to the cluster when the multicast data is successfully received from the network, and the cluster head may send a negative acknowledgment (NACK) feedback to all other UEs belong to the cluster when the multicast data is not successfully received from the network. According the second option, the cluster head may only send the positive acknowledgment (ACK) feedback to all other UEs belong to the cluster when the multicast data is successfully received from the network. In the second option, the cluster head may not send the NACK feedback to all other UEs belong to the cluster even if the multicast data is not successfully received from the network. According the third option, the cluster head may only send the negative acknowledgment (NACK) feedback to all other UEs belong to the cluster when the multicast data is not successfully received from the network. In the third option, the cluster head may not send the ACK feedback to all other UEs belong to the cluster even if the multicast data is successfully received from the network. In this step, all UEs belong to the cluster are monitoring to check whether or not the multicast data transmitted from the network is successfully received by the cluster head.

Thereafter, all UEs except for the cluster head may notify to other UE whether or not the multicast data transmitted from the network is successfully received. Here, this notification may be transmitted to other UEs through the D2D link established in the cluster (S3). Here, the reception of the multicast data may be notified by each UE belong to the cluster (except for the cluster head) as following three different options: 1) always notify, 2) ACK based feedback, and 3) NACK based feedback. According to the first option, each UE may send a positive acknowledgment (ACK) feedback to all other UEs belong to the cluster when the multicast data is successfully received from the network, and the each UE may send a negative acknowledgment (NACK) feedback to all other UEs belong to the cluster when the multicast data is not successfully received from the network. According the second option, each UE may only send the positive acknowledgment (ACK) feedback to all other UEs belong to the cluster when the multicast data is successfully received from the network. In the second option, the each UE may not send the NACK feedback to all other UEs belong to the cluster even if the multicast data is not successfully received from the network. According to the third option, each UE may only send the negative acknowledgment (NACK) feedback to all other UEs belong to the cluster when the multicast data is not successfully received from the network. In the third option, the each UE may not send the ACK feedback to all other UEs belong to the cluster even if the multicast data is successfully received from the network. In this step, all UEs belong to the cluster are monitoring to check whether or not the multicast data transmitted from the network is successfully received by each UE.

Thereafter, a specific UE belong to the cluster may transmit a HARQ feedback to the network (S4). Specifically, in case that the cluster head successfully receives the multicast data from the network, the cluster head may transmit a positive acknowledgment (ACK) to the network. However, in case that the cluster head and all other UEs do not successfully receive the multicast data from the network, the cluster head may transmit a negative acknowledgment (NACK) to the network. Further, in case that the cluster head does not successfully receive the multicast data but other UEs successfully receive the multicast data, a UE having highest ranking number among the UEs that successfully receive the multicast data may transmit the positive acknowledgment (ACK) to the network. Here, the ranking number for each of UE belong to the cluster may be assigned during a generation of the cluster or a joining to the cluster.

In general, the cluster head may transmit the positive acknowledgment (ACK) to the network, when the cluster head successfully receives the multicast data from the network. Alternatively, the cluster head may transmit the positive acknowledgment (ACK) to the network, when one or more UEs belong to the cluster successfully receive the multicast data from the network regardless of the multicast reception by the cluster head. After the HARQ feedback operation, a multicast data retransmission may be performed (S5). Here, the multicast data retransmission may be performed only when the cluster head transmits the NACK to the network in step 4. In particular, the retransmission of the multicast data may be performed by the network when the network receives the NACK from the UE (e.g., cluster head). The retransmitted multicast data may be transmitted to the cluster head, and thereafter, the cluster head may forward the retransmitted multicast data to all UEs, which did not successfully receive the multicast data in previous steps, through the D2D link.

In case that the cluster head successfully receives the multicast data from the network but other UEs do not successfully receive the multicast data from the network, the cluster head may forward the multicast data to the UEs, which did not successfully receive the multicast data in previous steps, through the D2D link.

In case that the cluster head does not successfully receive the multicast data but other UEs successfully receive the multicast data, a UE, which has highest ranking number among the UEs that successfully receive the multicast data, may forward the multicast data to the cluster head and UEs, which did not successfully receive the multicast data in previous steps, through the D2D link.

The present disclosure is to provide a way of minimizing a HARQ signaling overhead in a device-to-device communications system. For example, if all UEs or devices belong to a cluster transmit HARQ feedback information to a network, this would cause a large amount of HARQ signaling overhead. In order to minimize the HARQ signaling overhead, a device-to-device (D2D) link has been adapted to utilize according to the present disclosure. That is, instead of transmitting the HARQ feedback information by all UEs or devices, only one UE or device belong to the cluster may transmit the HARQ feedback information to the network on behalf of all UEs or devices. Further, if there are any UEs or devices that did not successfully receive multicast data from the network at an initial multicast data transmission, the multicast data may be retransmitted by other UEs, which successfully receive the multicast data. Here, the retransmission of the multicast data may be performed through the D2D link.

Figure 4:
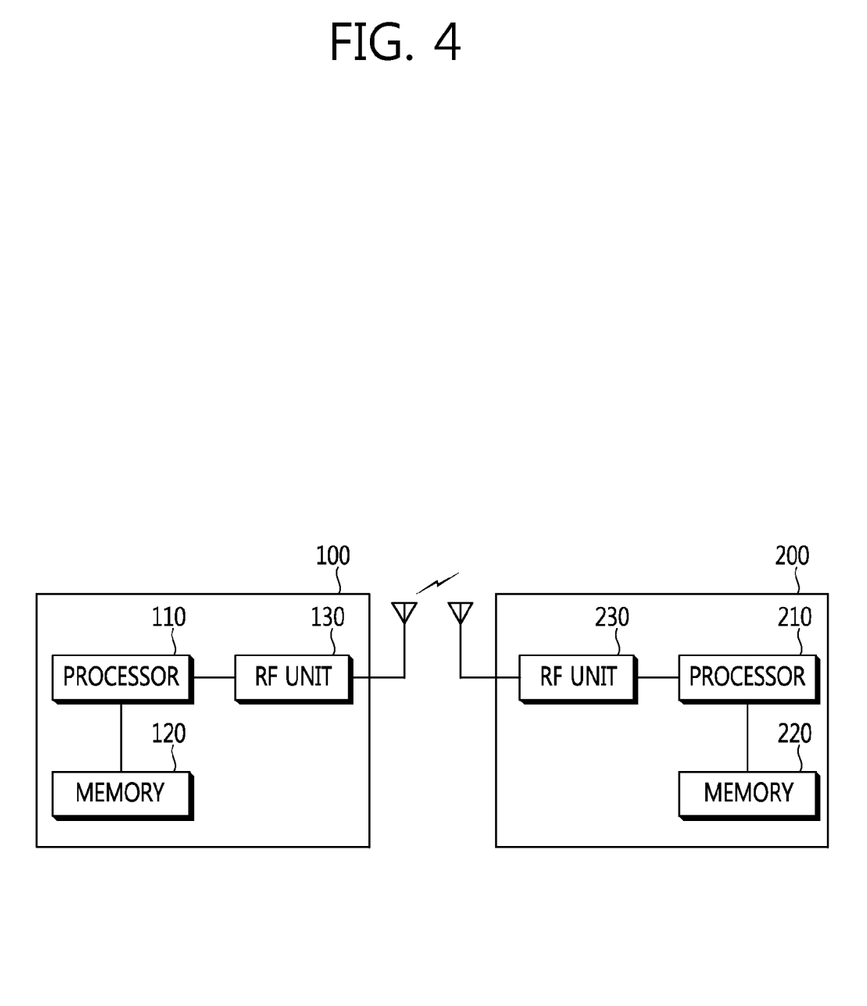
FIG. 4 shows a structure of devices used in a device-to-device (D2D) communication system.

FIG. 4 illustrates a structure of devices used in device-to-device (D2D) communication system according to the present invention.

A device 100 may include a processor 110, a memory 120 and a radio frequency (RF) unit 130. The processor 110 may be configured to implement proposed functions, procedures and/or methods described in this description. Layers of the radio interface protocol may be implemented in the processor 110. The memory 120 is operatively coupled with the processor 110 and stores a variety of information to operate the processor 110. The RF unit 130 is operatively coupled with the processor 110, and transmits and/or receives a radio signal.

Another device 200 may include a processor 210, a memory 220 and a RF unit 230. The processor 210 may be configured to implement proposed functions, procedures and/or methods described in this description. Layers of the radio interface protocol may be implemented in the processor 210. The memory 220 is operatively coupled with the processor 210 and stores a variety of information to operate the processor 210. The RF unit 230 is operatively coupled with the processor 910, and transmits and/or receives a radio signal.

The processors 110, 210 may include application-specific integrated circuit (ASIC), other chipset, logic circuit and/or data processing device. The memories 120, 220 may include read-only memory (ROM), random access memory (RAM), flash memory, memory card, storage medium and/or other storage device. The RF units 130, 230 may include baseband circuitry to process radio frequency signals. When the embodiments are implemented in software, the techniques described herein can be implemented with modules (e.g., procedures, functions, and so on) that perform the functions described herein. The modules can be stored in memories 120, 220 and executed by processors 110, 210. The memories 120, 220 can be implemented within the processors 110, 210 or external to the processors 110, 210 in which case those can be communicatively coupled to the processors 110, 210 via various means as is known in the art.

The present disclosure may provide a method for transmitting feedback information in a device-to-device (D2D) communication system, the method comprising: determining a cluster head among a plurality of user equipment (UE) belong to a cluster, wherein the cluster head is determined according to a certain condition; receiving, by the cluster head, multicast data from a network; transmitting, by the cluster head, a notification to other UEs belong to the cluster whether or not the multicast data is successfully received by the cluster head; determining whether or not the multicast data is successfully received by the other UEs belong to the cluster; transmitting the feedback information to the network based on the determining step, and receiving a retransmitted multicast data from the network if it is determined that the multicast data is not successfully received, where the notification is transmitted through a device-to-device (D2D) link, the notification is transmitted according to either an ACK based feedback scheme or a NACK based feedback scheme, the feedback information is at least a positive acknowledgment (ACK) message or a negative acknowledgment (NACK) message, the ACK message is transmitted to the network if it is determined that the cluster head successfully receives the multicast data, the NACK message is transmitted to the network if it is determined that the cluster head and the other UEs are not successfully receive the multicast data, the ACK message is transmitted to the network by a UE other than the cluster head if it is determined that the cluster head does not successfully receive the multicast data but at least other UEs successfully receive the multicast data, and the retransmitted data is forwarded to the other UEs through a device-to-device (D2D) link.

Also, it can be said that the present disclosure may provide an apparatus for transmitting feedback information in a device-to-device (D2D) communication system, the apparatus comprising: a radio frequency (RF) unit for transmitting or receiving data; and a processor, operatively coupled to the RF unit, and configured for: determining a cluster head among a plurality of user equipment (UE) belong to a cluster, wherein the cluster head is determined according to a certain condition; receiving multicast data from a network; transmitting a notification to other UEs belong to the cluster whether or not the multicast data is successfully received by the cluster head; determining whether or not the multicast data is successfully received by the other UEs belong to the cluster; transmitting the feedback information to the network based on the determining step; and receiving a retransmitted multicast data from the network if it is determined that the multicast data is not successfully received, where the notification is transmitted through a device-to-device (D2D) link, the notification is transmitted according to either an ACK based feedback scheme or a NACK based feedback scheme, the feedback information is at least a positive acknowledgment (ACK) message or a negative acknowledgment (NACK) message, the ACK message is transmitted to the network if it is determined that the cluster head successfully receives the multicast data, the NACK message is transmitted to the network if it is determined that the cluster head and the other UEs are not successfully receive the multicast data, the ACK message is transmitted to the network by a UE other than the cluster head if it is determined that the cluster head does not successfully receive the multicast data but at least other UEs successfully receive the multicast data, and the retransmitted data is forwarded to the other UEs through a device-to-device (D2D) link.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, embodiments of the present invention are described centering on the data transmission/reception relations between a base station and a user equipment. In this disclosure, a specific operation explained as performed by a base station may be performed by an upper node of the base station in some cases. In particular, in a network constructed with a plurality of network nodes including a base station, it is apparent that various operations performed for communication with user equipment may be performed by a base station or other networks except the base station. In this case, 'base station' can be replaced by such a terminology as a fixed station, a Node B, an eNode B (eNB), an access point and the like. And, 'terminal' may be replaced by such a terminology as a user equipment (UE), a mobile station (MS), a mobile subscriber station (MSS) and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method for transmitting feedback information in a device-to-device (D2D) communication system, the method comprising:
receiving, by a cluster head, multicast data from a network,
wherein the cluster head is selected among a plurality of user equipment (UE) belonging to a cluster,
wherein the cluster head is selected by a ranking number of each of the plurality of UE belonging to the cluster, wherein the ranking number is determined by a capacity of a processor installed within the UE or a location of the UE, and wherein the multicast data is also transmitted from the network to other UEs belonging to the cluster;

transmitting, by the cluster head, a notification to the other UEs belonging to the cluster whether or not the multicast data is successfully received by the cluster head, wherein the notification is transmitted through a device-to-device (D2D) link;

determining whether or not the multicast data is successfully received by the other UEs belonging to the cluster; and transmitting the feedback information to the network based on the determining, wherein the feedback information is at least a positive acknowledgment (ACK) message or a negative acknowledgment (NACK) message, wherein the ACK message is transmitted to the network by a UE other than the cluster head if it is determined that the cluster head does not successfully receive the multicast data but at least other UEs successfully receive the multicast data, and wherein the UE other than the cluster head has a highest ranking number among the UEs that successfully receive the multicast data.

2. The method of claim 1, further comprising: receiving a retransmitted multicast data from the network if it is determined that the multicast data is not successfully received by the cluster head or the other UEs belonging to the cluster.

3. The method of claim 2, wherein the retransmitted data is forwarded to the other UEs through a device-to-device (D2D) link.

4. The method of claim 1, wherein the notification is transmitted according to either an ACK based feedback scheme or a NACK based feedback scheme.

5. The method of claim 1, wherein the ACK message is transmitted to the network if it is determined that the cluster head successfully receives the multicast data.

6. The method of claim 5, wherein the NACK message is transmitted to the network if it is determined that the cluster head and the other UEs are not successfully receive the multicast data.

7. An apparatus for transmitting feedback information in a device-to-device (D2D) communication system, the apparatus comprising:
a radio frequency (RF) unit for transmitting or receiving data; and
a processor, operatively coupled to the RF unit, and configured for:
receiving multicast data from a network,
wherein a cluster head is selected among a plurality of user equipment (UE) belonging to a cluster,
wherein the cluster head is selected by a ranking number of each of the plurality of UE belonging to the cluster,
wherein the ranking number is determined by a capacity of a processor installed within the UE or a location of the UE, and
wherein the multicast data is also transmitted from the network to other UEs belonging to the cluster;
transmitting a notification to the other UEs belonging to the cluster whether or not the multicast data is successfully received by the cluster head,
wherein the notification is transmitted through a device-to-device (D2D) link;
determining whether or not the multicast data is successfully received by the other UEs belonging to the cluster; and
transmitting the feedback information to the network based on the determining,
wherein the feedback information is at least a positive acknowledgment (ACK) message or a negative acknowledgment (NACK) message,
wherein the ACK message is transmitted to the network by a UE other than the cluster head if it is determined that the cluster head does not successfully receive the multicast data but at least other UEs successfully receive the multicast data, and
wherein the UE other than the cluster head has a highest ranking number among the UEs that successfully receive the multicast data.

8. The apparatus of claim 7, wherein the processor is further configured for receiving a retransmitted multicast data from the network if it is determined that the multicast data is not successfully received by the cluster head or the other UEs belonging to the cluster.

9. The apparatus of claim 8, wherein the retransmitted data is forwarded to the other UEs through a device-to-device (D2D) link.

10. The apparatus of claim 7, wherein the notification is transmitted according to either an ACK based feedback scheme or a NACK based feedback scheme.

11. The apparatus of claim 7, wherein the ACK message is transmitted to the network if it is determined that the cluster head successfully receives the multicast data.

12. The apparatus of claim 7, wherein the NACK message is transmitted to the network if it is determined that the cluster head and the other UEs are not successfully receive the multicast data.

* * * * *